Jan. 12, 1926. Re. 16,253
H. L. FISCHER ET AL
PENCIL
Original Filed Sept. 7, 1918
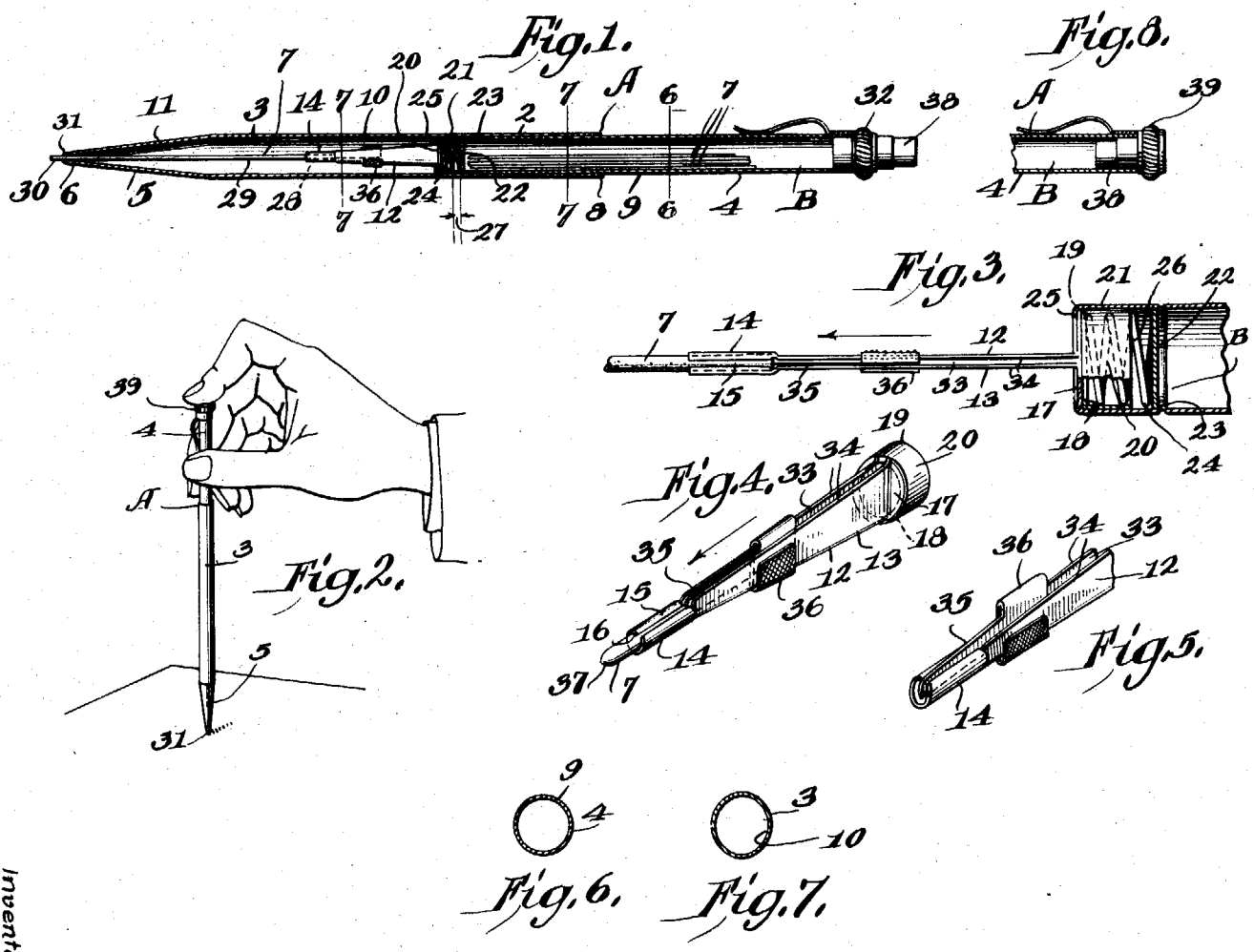
Inventors
Howard L. Fischer and
Frank J. Kristofek,
By Howard L. Fischer,
Attorney Reissued Jan. 12, 1926. Re. 16,253

UNITED STATES PATENT OFFICE.

HOWARD L. FISCHER AND FRANK J. KRISTOFEK, OF ST. PAUL, MINNESOTA, ASSIGNORS TO BROWN & BIGELOW, OF ST. PAUL, MINNESOTA, A CORPORATION OF MINNESOTA.

PENCIL.

Original No. 1,375,579, dated April 19, 1921, Serial No. 254,522, filed September 7, 1918. Application for reissue filed April 12, 1923. Serial No. 631,719.

*To all whom it may concern:*

Be it known that we, HOWARD L. FISCHER and FRANK J. KRISTOFEK, citizens of the United States, and residents of St. Paul, in the county of Ramsey and State of Minnesota, have invented a new and useful Improvement in Pencils, of which the following is a specification.

Our invention relates to pencils and is more particularly adapted to a pencil of simple construction very light in weight and extremely simple to operate having no complicated parts to get out of order.

The pencil is primarily designed to hold or use a marking lead having a very small diameter to eliminate the necessity of sharpening and allowing the use of a long lead making it unnecessary to replace the same with a new lead as often as when a short lead is used. This is an important feature and gives a pencil which is very desirable.

The marking lead held in writing position in our pencil is adapted to be projected a degree at a time as it is used or worn off by a simple ejecting means.

The peculiar features and objects of our pencil will be clearly set forth in the following specification and claims.

In the drawing forming part of the specification:

Figure 1 is a longitudinal cross section of our pencil.

Figure 2 illustrates the pencil held in vertical operating position.

Figure 3 is an enlarged detail of a portion of the pencil.

Figure 4 is a perspective view of a detail of the pencil.

Figure 5 is a perspective view of a detail portion of the pencil.

Figure 6 is a cross section on the lines 6—6 of Figure 1.

Figure 7 is a cross section on the lines 7—7 of Figure 1.

Figure 8 is a detail cross section of a portion of the pencil.

In the drawing A represents a pencil having a barrel 2 which is formed with a forward tubular member 3 and a rear tubular member 4. The members 3 and 4 are formed of very thin tubing to give a pencil barrel 2 of light weight and of any suitable material or metal to provide a device which is sufficiently strong and durable for practical use.

The member 3 is formed with a conical shaped forward end 5 having a longitudinal opening or hole 6 extending through the apex of the same which is of a diameter practically equivalent to the outside diameter of the thin marking lead 7 to allow the lead to pass through the opening 6 and form a bearing for the lead to hold it against transverse movement during writing. The rear end of the portion 3 is open and is adapted to receive the forward end of the member 4 to allow the member 4 to telescope into the member 3; the outer surface 9 of the member 4 engaging against the inner smooth surface 10 of the member 3 to frictionally hold the members 3 and 4 together. The member 4 has a circular cross sectional shape as illustrated in Figure 6, or of any suitable cross sectional shape and the member 3 is formed oval or distorted from the shape of the member 4, at or near its end 8, giving a distorted shaped cross section, as illustrated in Figure 7, so that when the member 4 is telescoped or slid into the member 3 the member 3 will engage against the outer surface 9 of the member 4 to frictionally hold the members 3 and 4 in set position, the distorted or oval shape of the member 3 causing the same to grip the member 4 with increased friction still allowing the members to be slid or telescoped together without materially increasing the friction between them when they are telescoped a larger or smaller degree and to be held concentric to each other. The oval or distorted cross sectional shape of the member 3 provides frictional means for gripping or engaging the member 4 sufficiently to take up the wear of the surfaces 9 and 10, and thus always maintain a sufficient friction between the members 3 and 4 to prevent the free sliding of the same during telescoping. The member 3 which is tubular formed with the inner smooth surface 10 is hollow and the conical end 5 is formed with the hollow inner conical chamber 11 which connects with the chamber formed by the surface 10 so as to provide the member 3 with a hollow inner chamber clear into the forwarding end of the conical portion 5 having no obstructions on its inner surface and providing a chamber into which a lead holding finger 12 can be projected.

The distortion of the member 3 should be at or near its inner end and not extending the length of the same so as to allow the members 3 and 4 to be held together at any telescoping degree with a uniform friction between them. The uniform smooth outer contour of the surface of the members 3 and 4 gives a pencil barrel with a uniform contour from one end to the other and the distorting of the cross sectional shape of the member 3 from the cross sectional shape of the member 4 gives a frictional means with sufficient resiliency to cause the distorted member to frictionally engage the smooth surface of the other member to give the desired amount of friction between the members to hold them in place, or in a set position, allowing the members to be telescoped any degree and preventing the friction between the members becoming too great to be slidable in relation to each other, with a uniform friction between them when telescoped a larger or lesser degree, also taking up the wear between the members three and four to maintain sufficient friction between the members to hold them in place, as is desired.

The distortion of the member 3 should be at a single point and thus prevent the members 3 and 4 from becoming so tightly frictionally engaged, when the member 4 is telescoped or slid into the member 3, that it would require a larger amount of force to separate the members. It is an important feature of the construction of the pencil A that the member 4 slide or telescope practically its full length into the member 3 to allow as long a marking lead to be used in the pencil as possible, the hollow tubular construction allowing this to be accomplished and giving a pencil with a smooth uniform outer contour at any degree of telescoping of the members 3 and 4.

The barrel of the pencil A is formed of two hollow members 3 and 4, which are of a uniform thickness throughout their length, thus providing a uniform inner and outer contour to said pencil barrel.

The lead holding finger 12 is formed of thin sheet material having a U-shaped flat body portion 13 which tapers forward and is formed with a socket 14 on its forward end. The socket 14 is formed with an open longitudinally extending slot 15 on one side and the socket is adapted to receive and hold the rear end 28 of the marking lead 7 under spring tension to rigidly grip the same. One edge of the slot 15 is bent or turned inwardly to form a sharp edge 16 extending longitudinaly the length of the socket and which is adapted to engage the surface of the marking lead 7, which extends into socket 14, to grip the same and hold it against rotation in the socket. The rear end of the finger 12 is formed with flanges or ears 17 which are rigidly secured to the inturned flange 18 of the cylindrical member 19 in any suitable manner. Thus the ears 17 practically close one end of the cylindrical member 19 to form a cup shaped head member 20 which is adapted to telescope freely into the forward end 21 of the member 4.

A disk or washer 22 is positioned in the forward end of the member 4 and is held against an annular inturned shoulder 23 by the coil spring 24 which is positioned in the cup or head 20 and interposed between the cup and the disk 22, the forward edge of the member 4 being beaded or turned in to form a stop for the forward edge of the cup or head 20 to hold the same from sliding out of the forward end 21 of the member 4. When the spring 24 is expanded and the cup or head held against the inturned washer-like end 25, the rear edge 26 of the cup or head 20 is spaced a short distance away from the disk 22 and the spring 24 is sufficiently flexible to allow the cup or head 20 to slide backward until the annular edge 26 of the cup engages against the washer 22, when pressure in a longitudinal backward direction is exerted against the finger 12. The distance of backward movement in the end 21 of the cup or head 20 is indicated by the space 27 between the lines and the arrows, as illustrated in Fig. 1. This construction provides means for limiting or gaging the backward movement of the finger 12 and allows the use of any suitable resilient member in place of the spring 24 without varying the distance of the backward movement of the finger 12. The resilient means 24 keeps the finger 12 in forward position, as illustrated in Fig. 1, when no pressure is exerted against the same in a longitudinal direction. Thus when a marking lead 7 is held in writing position as illustrated in Fig. 1, the rear end 28 of the same will be held in the socket 14 with the body portion 29 projecting axially through the forward end of the member 3 and the conical chamber 11 with the writing end of the lead projecting through the hole 6 and out of the apex of the conical end 5.

When the writing end 30 of the lead 7 is worn off and it is desired to project the lead out of the apex the conical end 5 to give a new writing point the rear portion 4 of the pencil A is held between the thumb and the middle finger with the apex 31 of the conical end 5 resting on a table or suitable object and with the index finger pressure is exerted against the rear end of the cap 32 of the pencil as illustrated in Fig. 2, which causes the marking lead 7 to transmit a pressure in a longitudinal backward direction against the finger 12 pushing the cup or head 20 backward and compressing the spring 24 the distance of the space 27, causing the members 3 and 4 to telescope the same distance and when the longitudinal pressure is released from the head of the pencil the spring 24 will expand and project the marking lead 7 the same distance that the members 3 and 4 have telescoped or equal to the space 27. In this manner as fast as the marking lead is worn off it is projected a short distance until the same has been entirely used and the ejecting finger 12 has entered the inner conical chamber 11 with its forward edge engaging against the inner surface of the apex conical chamber 11. The members 3 and 4 are then separated so that a new marking lead can be inserted in the socket 14.

The body portion 13 of the lead holding finger 12 is formed with a narrow space 33 between its sides 34 leaving an open slot in one side of the body portion 13 which is adapted to receive an ejecting finger 35, and hold the same freely slidable between the side 34, as illustrated in Figs. 3 and 4. When the lead 7 has its rear end 28 held under spring tension in the socket 14 the ejecting finger 35 is positioned with its forward end abutting the end of the lead 7 and lying in line with the slot 15 in the socket 14.

The finger 35 is slidably held to the body portion 13 against disengagement therefrom by the band portion 36 which is formed integral with the rear end of the finger 35 and is bent around the outer surface of the flat body portion 13. The band 36 can be engaged to slide the finger 35 forward or backward between the sides 34.

When it is desired to insert a new marking lead 7 into the socket 14 the members 3 and 4 are drawn apart or separated and the old stub 37 of the worn out lead is ejected by engaging the band 36 and sliding the finger 35 through the slot 15 of the socket 14 into forward position, as illustrated in Fig. 5, thereby ejecting the stub 37, the finger 35 is then withdrawn into backward position and a new marking lead 7 can be easily inserted in the socket 14. After the new marking lead is in position in the socket 14 the member 4 is slid or telescoped into the rear end of the member 3 and by holding the pencil in the position illustrated in Fig. 2 with the index finger pressing the member 4 into the member 3 until the lead 7 has forced the finger 12 with the cup or head 20 to the limit of its backward movement, or equal to the space 27, thus limiting the telescoping distance of the members 3 and 4 and when the pressure of the index finger is released and the pencil A raised from the position illustrated in Fig. 2 the spring 24 will force the marking lead 7 out of the apex 31 to give a projecting writing end 30.

The operation of the pencil A is very simple and the lead 7 can be quickly ejected the desired amount from the apex 31 of the same, thus giving a pencil with a neat appearance, light in weight, inexpensive to manufacture and not apt to get out of order. If the pencil is dropped point downward and strikes on the writing end 30 of the lead it will rarely break as the spring 24 will cushion the same taking the severe jar off of the writing lead. Should the pencil be dropped hard enough to break the writing lead 7 it will not clog the hole 6 or the inner chamber of the member 3 with its conical chamber 11. This is a very important feature of our pencil as heretofore pencils with a small marking lead have given considerable trouble to the user if dropped on the projecting end of the marking lead, particularly in construction of pencils where the marking lead 7 has its body portion supported in a small tube having an inner diameter of approximately the same as the outer diameter of the marking lead and with a push rod projecting into the tube and forming an abutment for the marking lead. When pencils of this construction are dropped on their point the marking lead is usually crushed in the tube holding the same, at the point of the abutment of the ejecting rod, jamming or wedging the crushed particles of the marking lead in the tube so tightly that it is impossible by ordinary means to clear the lead holding tube for a new marking lead.

In our construction of pencil the socket 14 firmly holds the rear end 28 of the lead and the large chamber in which the body portion 29 extends allowing the body portion 29 or the projecting end 30 of the lead to break off without jamming the passageway or hole 6 and in this manner anyone can easily insert a new marking lead should the one in use be broken by dropping the pencil.

The oval shape of the cylindrical portion of the member 3 is very important to equalize the friction between the members 3 and 4 causing them to remain telescoped when they are slid together as illustrated in Fig. 2 allowing the resilient means 24 to eject the writing end 30 when the pressure on the cap of the pencil is released and the friction between the members 3 and 4 to be greater than the force required to compress the spring 24.

The hollow cylindrical member 4 forms a magazine B for extra lead 7, the rear end of which is adapted to be closed by a suitable cap 32. The cap 32 as illustrated in Fig. 1 is adapted to carry an eraser 38 projecting from the same and if it is desired the cap can be inverted to place the eraser extending into the magazine B.

In Fig. 8 an alternative form of cap 39 for the magazine B is illustrated and this cap is adapted to close the end of the magazine B and also hold an eraser 38 projecting into the magazine and enclosed by the same.

The space 27 illustrated in Fig. 1 by the distance between the edge 26 of the head 20 and the disk 22 is an important feature of our pencil as it allows the use of resilient means such as 24 having a varying resiliency in different pencils. Thus in the manufacture of our pencil A it is not necessary to have each resilient member 24 exactly the same in every pencil as the distance between the edge 26 and the surface of the disk 22 forms a gage for the projecting of the marking lead and no matter how great the pressure exerted by the index finger when the pencil is held in the position, illustrated in Fig. 2, the members 3 and 4 can only be telescoped the distance 27 and the lead 7 ejected the same distance out of the apex 31 of the pencil when the index finger pressure is released.

The construction of our pencil is very practical for the reason that whenever pressure is exerted against the apex 31 of the same, such as is illustrated in Fig. 2 or when the pencil is dropped on the apex, the marking lead pushes backward into the barrel, thereby protecting the marking lead whereby it otherwise may be broken off. The resilience back of the lead holding finger 12 is not detrimental in writing with the pencil A for the reason that the pencil is held in the hand of the user on an angle and the hardest pressure exerted in writing is on the down strokes, thus causing a pressure on a transverse angle of the lead instead of a direct longitudinal pressure.

Obviously the head or cap 20 fits within the end 21 of the member 4 freely so that the lead carrying stem 12 will wobble or adjust itself freely so that the marking lead held in the socket 14 will enter the opening 6 in the apex 31 of the pencil A freely. The inturned washer-like end 25 of the portion 4 of the pencil forms a stop against which the head or cap 20 engages to hold the head within the end of the member 4 so that the lead holding finger or stem 12 projecting from the head 20 may be freely adjustable in the pencil, while the washer 22 forms a stop against which the head and spring engage. These parts form a washer-like end on the member 4 between which the head 20 operates.

In accordance with the patent statutes we have described the principles of operation of our invention, together with the apparatus which we now consider to represent the best embodiment thereof, but we desire to have it understood that the construction shown is only illustrative and that the invention can be carried out by other means and applied to uses other than those above set forth within the scope of the following claims:

We claim:

1. A pencil having its body formed of two thin walled telescoping tubular members of similar transverse formation throughout the major part of their telescopic length each member having a thin tubular wall throughout its length, a lead holding means resiliently connected to the inner end of the rear member for holding a marking lead to project through the forward member in writing position and frictional means formed by distorting the undivided inner end of the forward member to engage the uniform smooth outer surface of the rear member to hold said members frictionally together with the outer contour of said pencil body symmetrical throughout its length.

2. In a pencil, a barrel comprising front and rear telescoping members, said rear member having a smooth outer surface and a uniform cross section throughout the major part of its length, said front member being formed of thin-walled tubing having a smooth inner surface and adapted to slide over the outer smooth surface of said rear member, a cross section of the rear end of said front member being of a greater diameter than the outer diameter of said rear member one way and of a less diameter than the outer diameter of said rear member the other way to cause said front member to engage the smooth outer surface of said rear member under spring tension to hold said members together and lead holding means connected to the outer end of said rear member for holding the marking lead to project through the other member in writing position.

3. In a pencil, a barrel comprising front and rear telescoping members, a lead-holding member having means at one end to engage the lead, whereby the latter projects through the forward member in writing position, said lead-holding member having at its opposite end a head, the inner end of the rear member having a retaining part for said head, and a disc in the rear member adjacent the inner end overlying the rear surface of said head, said head being adapted for relative movement with respect to the rear member, and the front and rear members being formed of thin wall tubing, the cross-sections of which are so proportioned as to cause the front member to engage the outer surface of the rear member under spring tension.

4. A pencil having its body formed of two thin walled metallic telescoping tubular members, and a lead-holding means movably connected at its rear end to the inner end of the rear member for holding a marking lead to project through the forward member in writing position, the wall of one of the inner and outer members being relatively distorted whereby they are frictionally held under spring tension in adjusted position.

5. A pencil having its body formed of two thin walled metallic telescoping tubular members, a lead-holding means movably connected at its rear end to the inner end of the rear member for holding a marking lead to project through the forward member in writing position, and movable lead-ejecting means carried by said holding means, the walls of the inner and outer members being relatively distorted whereby they are frictionally held under spring tension in adjusted position.

6. A pencil having its body part formed of two thin walled metallic telescoping tubular members, a lead-holding means having at one end a lead-gripping socket and at its opposite end a retaining head movably connected to the inner end of the rear member, whereby a marking lead may be positioned to project through the forward member in writing position, and a portion of the overlapping walls of the inner and outer members being relatively distorted whereby the telescoping members are retained under spring tension in adjusted position.

HOWARD L. FISCHER.
FRANK J. KRISTOFEK.